Sept. 15, 1964 A. W. SIMMONS ETAL 3,148,919
FLUID PRESSURE VEHICLE BRAKING APPARATUS
Filed May 5, 1961
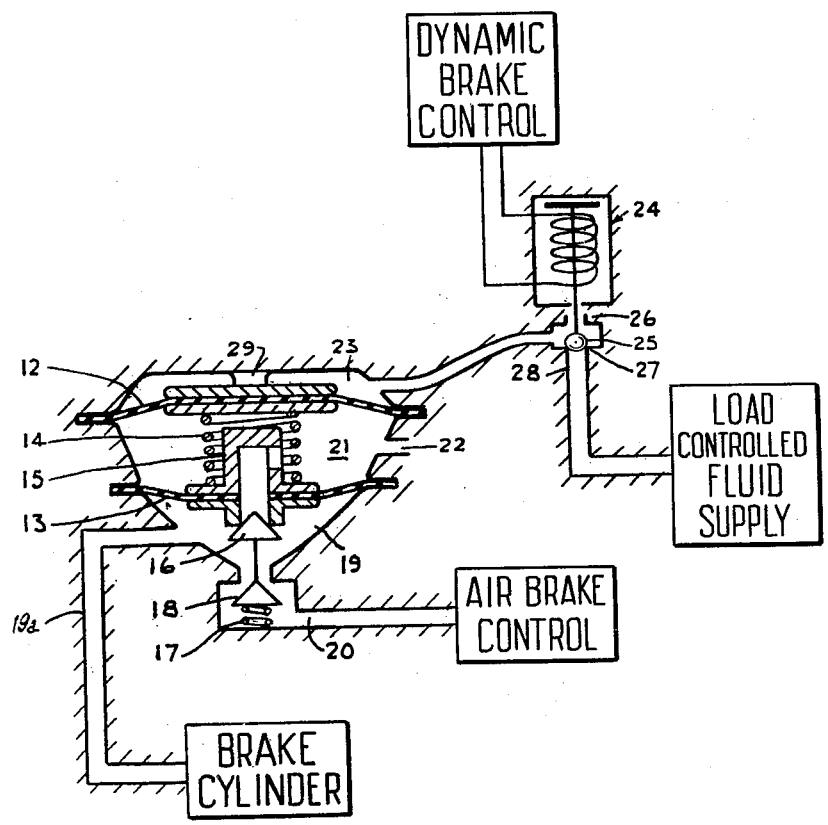

United States Patent Office 3,148,919
Patented Sept. 15, 1964

3,148,919
FLUID PRESSURE VEHICLE BRAKING
APPARATUS
Arthur William Simmons and Jack Washbourn, London, England, assignors to Westinghouse Brake and Signal Company, Limited, London, England
Filed May 5, 1961, Ser. No. 107,936
4 Claims. (Cl. 303—3)

The present invention relates to fluid pressure braking apparatus as used on vehicles, and is concerned more particularly with valve devices for limiting the magnitude of pressure differential permitted to build up in a brake cylinder in the course of a brake application. Broadly the invention is applicable to braking apparatus employing fluid for its operation which is either at a super-atmospheric pressure or at a sub-atmospheric pressure, and references herein to "pressure" are to be construed accordingly.

A brake cylinder pressure limiting valve device affords the possibility of determining a maximum degree of brake application regardless of whether the manually operable brake controlling means is set for a higher degree. Such a device is used, for example, in various forms of variable load braking apparatus to ensure that a limit proportional to the vehicle load is imposed on the brake cylinder pressure differential in order that overbraking, and consequent skidding of the vehicle wheels, shall not occur.

The present invention provides, in or for fluid pressure vehicle braking apparatus, a brake cylinder pressure limiting valve device with means controllable to one position in which the setting of the device is variable in proportion to the vehicle load and to another position in which a predetermined constant setting of the device is maintained.

More particularly, according to the present invention, the setting of the brake cylinder pressure limiting valve device, in or for a fluid pressure vehicle braking apparatus, is determined in dependence upon which of two alternative pressures is admitted thereto under the control of a valve means, one of these two pressures being variable with the vehicle load.

Fluid pressure braking apparatus employed in conjunction with a dynamic brake, such as a rheostatic or regenerative brake, generally serves as a standby and is held in reserve for use when the dynamic brake fades or if it should fail. In order, however, that the fluid pressure apparatus may be ready to take over, it can be arranged that the initiation of a dynamic brake application causes the fluid pressure apparatus to be operated simultaneously as if to make an equivalent degree of brake application; in the final stage the fluid pressure application is restrained from taking full effect by limitation of the brake cylinder pressure to some relatively small amount, such as from 15 to 20% of maximum brake cylinder pressure. Such limitation is operative only when the dynamic brake is fully effective, so that in the event of this brake fading, or even failing to come into operation correctly, a brake cylinder pressure is already present and can be supplemented to the requisite amount without delay. The light application of the fluid pressure apparatus accompanying each dynamic brake application may serve also to ensure that the brake engaging surfaces of the vehicle wheels are kept in good condition by the periodic engagement therewith of the friction elements or brake shoes which are actuated by the fluid pressure apparatus.

As applied to composite fluid pressure and dynamic braking apparatus, the brake cylinder pressure limiting valve device in accordance with the present invention affords a constant light degree of fluid pressure brake application when the dynamic brake is fully effective and a degree of such application which is limited in accordance with the vehicle load when the dynamic brake fades or fails to come into operation. It is notable that both functions are performed by the same valve device.

The invention will be further described with reference to the embodiment shown diagrammatically and by way of example, in the accompanying drawing.

This embodiment is for use with composite compressed fluid and dynamic braking apparatus for railway vehicles.

The illustrated brake cylinder pressure limiting valve device has a casing made up of several sections between which are clamped the outer margins of two spaced coaxial diaphragms 12 and 13 having interposed between them a coiled compression spring 14. A central opening through the diaphragm 13 is bounded by a tubular stem 15 which is carried by the diaphragm and has its lower end formed as a valve seat co-operating with an exhaust valve member 16. This member is part of a double valve assembly movable axially of the tubular stem and biassed lightly by a spring 17 in the direction to seat an admission valve member 18, constituting another part of the assembly, on a seat between a chamber 19 beneath the diaphragm 13 and a supply chamber 20. The chamber 19 is in permanently open communication with a brake cylinder through a passage 19a while the supply chamber 20 is connected to receive compressed fluid from a triple valve or similar brake application valve device which in known manner is utilized in the compressed fluid apparatus for controlling the supply of compressed fluid to the brake cylinder.

The chamber 21 intermediate the two diaphragms is permanently open to the atmosphere through a vent opening 22. Likewise the hollow interior of the tubular stem 15 is in permanent communication with the chamber 21 so that this stem co-operating with the exhaust valve member 16 controls a vent path for the brake cylinder. With the diaphragm 12 in the upper limit position, as shown, the spring 14 depresses the tubular stem sufficiently, together with the attached diaphragm 13, to unseat the admission valve member 18 through engagement with the exhaust valve member 16. A relatively low pressure, such as for example 10 lbs. per square inch, built up in the brake cylinder by admission of compressed fluid from the supply chamber 20 will then suffice to deflect the diaphragm 13 upwards against the resistance of the spring to the lap position in which both the valve members are seated. Flow to the brake cylinder is then interrupted and the pressure therein is thus limited to a constant low value determined by the spring.

The diaphragm 12 serves as a loading means since the admission of compressed fluid to a chamber 23, which this diaphragm separates from the atmospheric chamber 21, will modify in dependence upon the pressure built up in the chamber the force acting downwards on the diaphragm 13 to resist deflection thereof to the lap position.

A changeover means constituted by an electromagnetically operated valve designated generally 24 is employed to determine which of two pressures is admitted to the chamber 23. A freely floating ball 25 serving as the closure member of this valve is movable between an upper seat 26 bounding an opening to atmosphere and a lower seat 27 bounding one end of a passage 28 which conducts to the valve continuously a supply of compressed fluid of which the pressure is variable steplessly in proportion to the vehicle load between an upper limit corresponding to full load and lower limit corresponding to no load. Apparatus for making available such a supply is already known and is therefore not shown, but at this point it should be mentioned that this apparatus need not be continuously sensitive to load changes; for example, it may be rendered free for adjustment only when the doors in the case of passenger equipment are opened.

When the dynamic brake of the composite braking apparatus is fully effective in the course of a brake application, the electromagnetically operated valve 24 is energised and forces down the ball closure member 25 against the pressure of compressed fluid in the passage 28 into seating engagement with the lower seat 27 so as to admit atmospheric pressure to the chamber 23. The diaphragm 12 therefore is held against a back stop 29 and does not load the lower diaphragm 13. Consequently, the brake cylinder pressure limiting valve device is set for the constant low value of brake cylinder pressure as previously set forth.

Should the dynamic brake not be effective or fade, the energisation of the electromagnetically operated valve is discontinued, or at least weakened, so that the ball closure member 25 is lifted into seating engagement with the upper seat 26 and the load variable supply is substituted for atmospheric pressure in the chamber 23. Even at its lower limit corresponding to no load, this supply provides over the area of the diaphragm 12 a sufficient force to collapse the spring 14 so that the diaphragm engages the stem 15 and the two diaphragms move in unison independently of the spring. The setting of the brake cylinder pressure limiting valve device is therefore now dependent upon the vehicle load, and the brake cylinder pressure is supplemented from the supply chamber 20 to the extent of this setting.

In referring herein to fluid pressure braking apparatus we mean to distinguish from a dynamic brake apparatus involving the use of fluid pressure to supply braking force. This term is therefore not to be restricted to apparatus operable solely by fluid pressure and is to be understood to include for example, electro-pneumatic brakes.

Having thus described our invention what we claim is:

1. In combination, a dynamic brake, a fluid pressure braking apparatus including a source of pressure and a brake cylinder connected therewith, a brake cylinder pressure limiting device intermediate said brake cylinder and said source of pressure, fluid pressure supply means variable in response to vehicle load connected through a control valve means to said pressure limiting device, said control valve means including means responsive to the effectiveness of said dynamic brake for closing said control valve upon actuation of said dynamic brake to thereby separate said fluid pressure supply from said pressure limiting device, said pressure limiting device including means for establishing a predetermined fluid pressure in said brake cylinder from said source of pressure upon separation of said pressure limiting device from said fluid pressure supply and for establishing fluid pressure in said brake cylinder in proportion to the pressure of said fluid pressure supply upon fluid communication of said pressure limiting device with said fluid pressure supply upon failure or weakening of said dynamic brake.

2. The apparatus of claim 1, said pressure limiting device including a pair of spaced diaphragms having a spring between them and urging them apart.

3. The apparatus of claim 1, said pressure limiting device including a pair of spaced diaphragms having a spring between them urging them apart, and abutment means between said diaphragms and extending from one diaphragm toward the other, fluid pressure from said fluid pressure supply means upon communication with said pressure limiting device moving one diaphragm toward the other until limited by said abutment means, whereby said diaphragms will move in unison independently of said spring.

4. In combination, a dynamic brake, a fluid pressure braking apparatus including a source of pressure and a brake cylinder connected therewith, a brake cylinder pressure limiting device intermediate said brake cylinder and said source of pressure, fluid pressure supply means variable in response to vehicle load connected through a control valve means to said pressure limiting device, said control valve means including means responsive to the effectiveness of said dynamic brake for closing said control valve upon actuation of said dynamic brake to thereby separate said fluid pressure supply from said pressure limiting device, said pressure limiting device including means for establishing a predetermined relatively low fluid pressure in said brake cylinder from said source of pressure upon separation of said pressure limiting device from said fluid pressure supply and for establishing relatively higher fluid pressure in said brake cylinder proportional to the pressure of said fluid pressure supply means upon fluid communication of said pressure limiting device with said fluid pressure supply upon failure or weakening of said dynamic brake.

References Cited in the file of this patent

UNITED STATES PATENTS

| | | |
|---|---|---|
| 1,842,497 | Whitaker | Jan. 26, 1932 |
| 1,850,609 | Thomas | Mar. 22, 1932 |
| 2,088,185 | Borde | July 27, 1937 |
| 2,616,641 | Gagen | Nov. 4, 1952 |
| 2,919,161 | Hammer | Dec. 29, 1959 |
| 2,933,350 | Hines | Apr. 19, 1960 |